Jan. 7, 1930. J. O. OTT 1,742,781
EDUCATIONAL APPLIANCE
Filed May 17, 1929 2 Sheets-Sheet 1
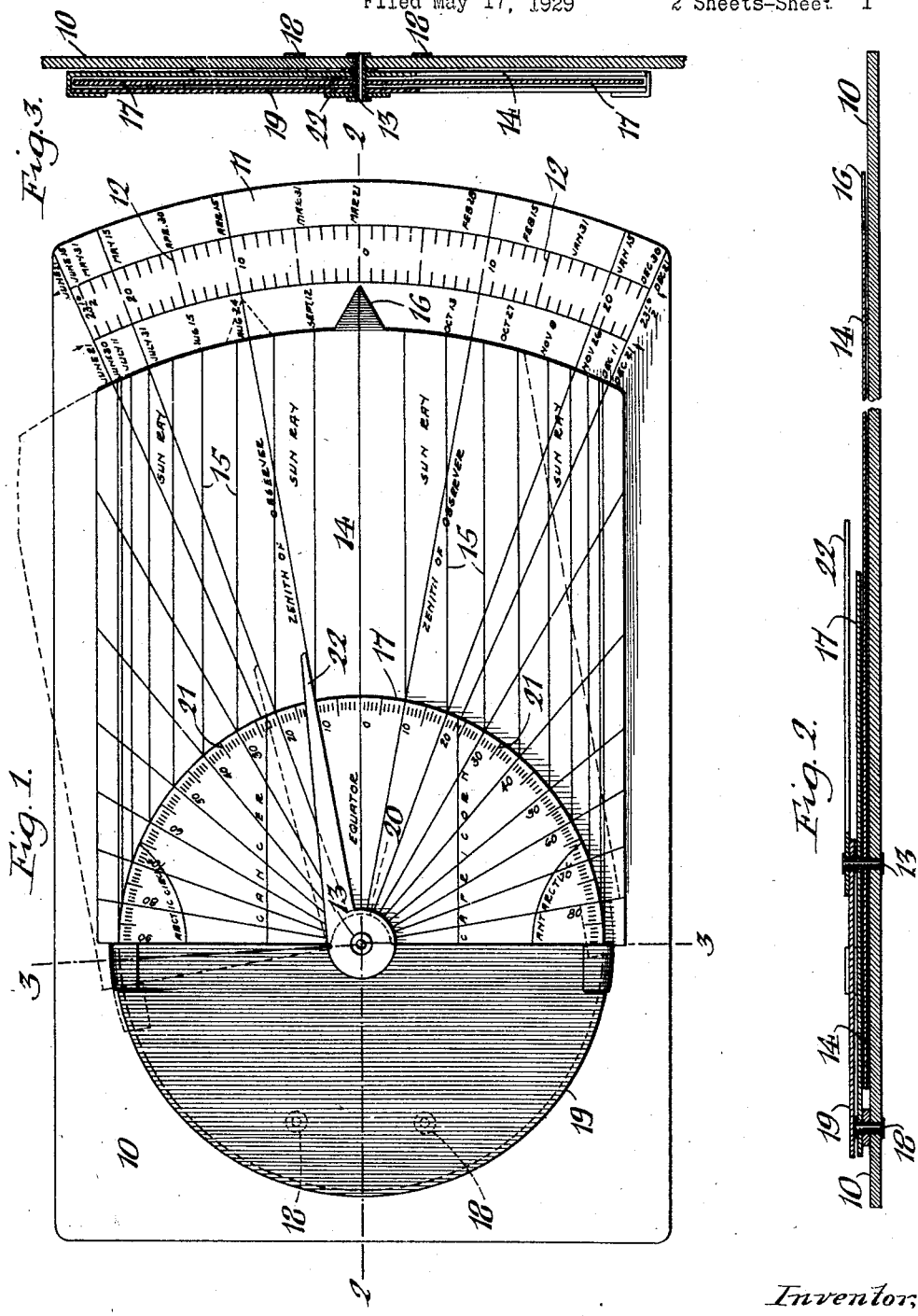

Jan. 7, 1930.  J. O. OTT  1,742,781
EDUCATIONAL APPLIANCE
Filed May 17, 1929   2 Sheets-Sheet 2
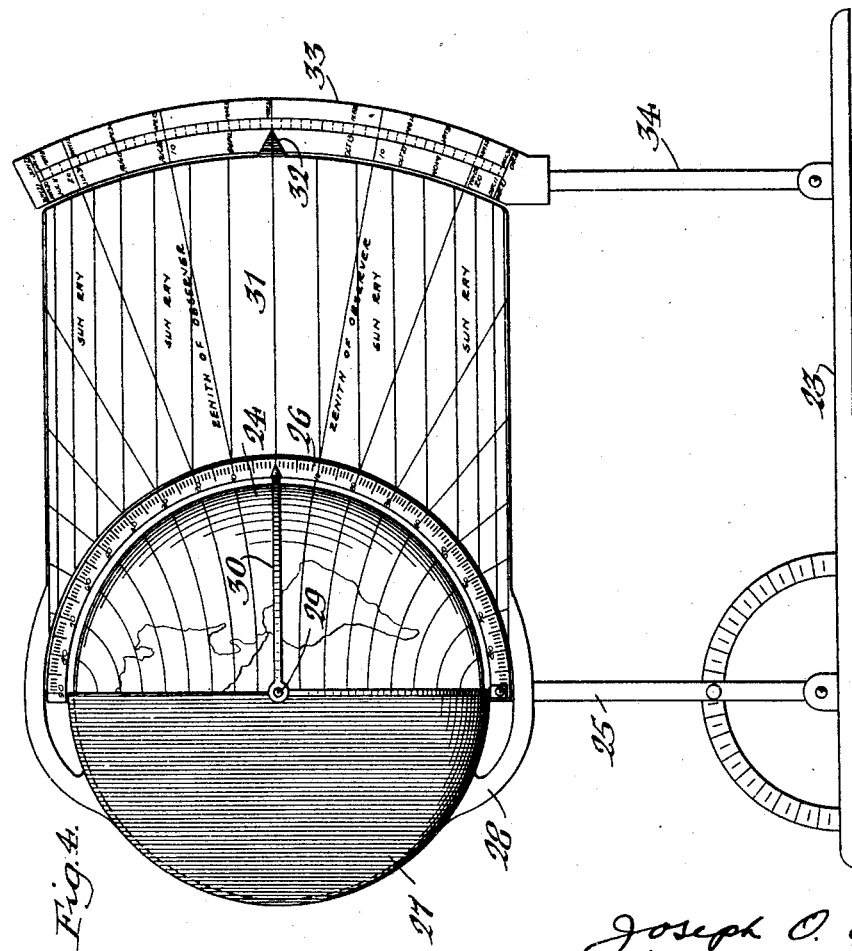

Patented Jan. 7, 1930

1,742,781

UNITED STATES PATENT OFFICE

JOSEPH O. OTT, OF NIAGARA FALLS, NEW YORK

EDUCATIONAL APPLIANCE

Application filed May 17, 1929. Serial No. 363,729.

This invention relates generally to an educational appliance but more particularly to a device of this character for calculating latitude.

Its objects are to provide a comparatively simple and inexpensive appliance of this nature which will enable the student to clearly understand how to find the latitude of an observer on the surface of the earth when the zenith of the observer and the sun's declination or the approximate date of the year is given; which is so constructed and organized as to make it easy for the pupil to understand the periods of daylight and darkness at the North and South Poles as well as why half of the earth is light while the other half is in darkness; and which will clearly show why the days grow longer and the nights shorter as the direct rays of the sun move north or south of the Equator.

In the accompanying drawings:—

Figure 1 is a face or top plan view of the educational appliance embodying one form of my invention. Figure 2 is a longitudinal section thereof taken on line 2—2, Figure 1. Figure 3 is a vertical section of the same taken on the line 3—3, Figure 1. Figure 4 is a side view of a modified form of the invention.

Similar characters of reference indicate corresponding parts throughout the several views.

In the preferred embodiment of my invention shown in Figures 1 to 3 inclusive, the educational appliance is substantially in the form of a chart which may be conveniently placed on a desk or table, or hung on the wall to suit the student or instructor in its manipulation. In its general organization it consists of a base plate or panel having a scale or dial thereon indicative of the months or seasons of the year, a panel indicative of the sun's rays mounted for movement to traverse the year-scale, a disk representing the earth, and an indicator arm or pointer arranged to traverse the earth-disk for indicating the latitude to be solved or calculated by this appliance.

The base plate or panel 10 is in the form of a flat sheet made of cardboard or other appropriate material and on which the various elements of the device are mounted. Adjacent one of its side edges this panel has a scale or segmental dial 11 for indicating the days and months of a year. As shown in Figure 1, the outer portion of the scale represents the period of time from December 21st to June 21st and the inner portion of the scale represents the period from June 21st to December 21st. This scale is also provided with graduations 12 indicating degrees above and below the horizontal or Equator line.

Overlying the front face of the base panel 10 and pivoted at 13 thereto, to swing in a plane parallel to said panel, is a second panel or member 14 having a series of parallel horizontal lines 15 thereon indicating the rays of the sun. The outer edge of this sun-ray panel is provided centrally thereof with a radially projecting pointer 16 which is adapted to traverse the scale 11 on the base panel and thereby indicate the position of the sun's declination relative to the Equator.

The disk 17, representing the earth, is arranged over the sun-ray panel 14 axially of its pivot 13 and has indicated thereon the Equator, the Arctic Circle, and the Antarctic Circle. This disk is fixed or anchored to the base panel by rivets 18 or other appropriate fastenings and the sun-ray panel is free to move relatively thereto; for this purpose, as seen in Figure 2, the rivets are located beyond the path of travel of the inner edge of the sun-ray panel. Attached to the rear edge of the latter and extending over the top face of the adjoining half of the earth-representing disk is a shield 19 having a hub-like portion 20 fitted to the pivot 13, so that when the sun-ray panel is turned about this pivot in one direction or the other, the shield is simultaneously turned therewith in a corresponding direction to cover or uncover the Arctic and Antarctic Zones of the earth. As shown in Figures 2 and 3, the shield 19 is disposed sufficiently above the plane of the sun-ray panel 14 to provide a space between these parts for receiving the disk 17. Along its marginal edge, the latter has a series of degree graduations 21. The shield 19 is preferably colored black to indicate that the portion of the earth covered by it is in darkness, while the disk and sun-ray panel are, in contrast, of a light color.

Fulcrumed on the pivot 13 is an indicator arm or pointer 22 which is disposed radially over the earth-representing disk 17 for indicating the sun's angle with the observer's zenith as well as the position of the observer on the earth. To accomplish this double-indicating purpose, the arm is free to be moved manually independently of the sun-ray panel to a given position to represent the angle of the sun with the zenith, or to be moved simultaneously with such panel in determining the observer's position on the earth. In the present case, the simultaneous action is obtained merely through frictional contact between the opposing hub-faces of the shield extension 19 of the sun-ray panel and the indicating arm, although it is to be understood that it may be accomplished by any other appropriate means.

To find the latitude of an observer on the surface of the earth when the zenith of the observer and the sun's declination or day of the year is given, the appliance is operated as follows:—

First, set the sun-ray panel 14 in direct line with the Equator on the earth-representing disk 17, with its pointer 16 opposite 0° on the scale 11 of the base panel 10. It is now assumed that the observer finds, for example, that the sun forms an angle with his zenith of 10° to the south. The indicator 22 is now set in this position which is easily ascertained by the degree scale 21 on the disk. It is thus evident that the observer's latitude on the surface of the earth is 10° north of the Equator when the sun is at this position. However, the declination of the sun at this time of the year is given as 10° north of the Equator; since this is true the sun's direct rays must be on the earth 10° north of the Equator. The sun-ray panel 14 is now shifted upwardly to bring the rays into this position. During this movement, the indicator arm 22 moves in unison with said panel 14, and upon reading the new position of the indicator arm on the scale 21 of the earth-representing disk, it will be found to be 20° north. This is the position of the observer when the sun's declination and the angle of the sun with the observer's zenith is 10° south.

Instead of having the declination given, the observer's position could also be approximately found from the various days of the year which are shown on the segmental dial 11 of the base panel 10.

Since light travels only in straight lines, one half of the earth can only be in light. The half that is in darkness necessarily depends for its shifting upon the rays of the sun. Hence, in my device the panel 14 representing the sun's rays is fastened to the shield 19 which overlies one half of the earth to show it in darkness. Therefore, if the sun's rays move south of the Equator, the area of darkness produced by the shield also moves the same number of degrees and brings the Arctic Circle into the period of darkness and the Antarctic into light. The vice versa of this is also true when the sun's rays move north of the Equator.

In addition to enabling a student to clearly understand how to find the latitude of an observer on the surface of the earth, this apparatus shows why the North and South Poles must have their periods of darkness and daylight, why one half of the earth is in light and the other half in darkness, and why the days grow longer and the nights shorter and vice versa, as the direct rays of the sun move north or south of the Equator. Furthermore, this device makes clear to students what is meant by the sun's declination and shows the approximate declination for the various days and seasons of the year.

In the modified form of the invention shown in Figure 4, the same is more in the form of a model applied on a platform or base board 23 and including a world globe 24 supported on a standard 25 and a yoke 26, the latter extending around one side of the globe and having degree graduations thereon. One half of the globe is covered by a shield 27 supported by a yoke 28 rising from the post. Fulcrumed at 29 is the indicator arm 30, which is similar to the arm 22 of the first-described construction, and which is adapted to traverse the scale on the yoke 26. The sun's rays is represented by the panel 31 arranged in alinement in the yoke 26 and suitably joined to the shield 27 and is movable circumferentially of the globe to represent the angle of the sun's declination. This sun ray panel has a pointer 32 thereon which traverses a scale 33 carried by a post 34 rising from the platform 23.

I claim as my invention:

1. An educational appliance of the character described, comprising a member representative of the earth, a panel indicative of the sun's rays movable relatively to said member above and below the Equator-line thereof for indicating the declination of the sun relative to the Equator, and a latitude indicator arm fulcrumed for movement radially of the earth-representing member.

2. An educational appliance of the character described, comprising a member representative of the earth having degree graduations thereon, a panel indicative of the sun's rays movable relatively to said member above and below the Equator for indicating the declination of the sun relative to the Equator, a fixed degree scale disposed concentrically with the earth-representing member and over which said sun-ray panel is adapted to traverse, and a latitude indicator arm fulcrumed for movement radially of the earth-representing member, said arm being movable independently of or in unison with the sun-ray panel.

3. An educational appliance of the character described, comprising a member representative of the earth having degree graduations thereon, a panel indicative of the sun's rays movable relatively to said member above and below the Equator for indicating the declination of the sun relative to the Equator, said panel having a pointer at its free edge, a fixed scale arranged concentric with the earth-representing member and positioned opposite the free edge of the sun-ray panel and over which its pointer is adapted to travel, said scale having degree graduations thereon and markings indicative of the days of the year, and an indicator arm fulcrumed for movement radially of the earth-representing member above and below the Equator to indicate the latitude of the observer on the surface of the earth.

4. An educational appliance of the character described, comprising a member representative of the earth, a panel indicative of the sun's rays movable relatively to said member above and below the Equator-line thereof for indicating the declination of the sun relative to the Equator, a shield carried by and movable with said sun-ray panel, said shield extending over approximately one half of the earth-representing member to indicate the area of darkness on the latter, and a latitude indicator arm fulcrumed for movement radially of said member.

5. An educational appliance of the character described, comprising a member representative of the earth, a panel indicative of the sun's rays movable relatively to said member above and below the Equator-line thereof for indicating the declination of the sun relative to the Equator, a shield carried by and movable with said sun-ray panel, said shield extending over approximately one half of the earth-representing member to indicate the area of darkness on the latter, the sun-ray panel having a pointer at its free edge, a scale positioned opposite and substantially in line with said panel and over which its pointer is adapted to travel to indicate the position of the sun's declination, said scale having degree graduations thereon and markings indicative of the days of the year, and an indicator arm fulcrumed for movement radially of the earth-representing member above and below the Equator to indicate the latitude of the observer on the surface of the earth, said arm being movable independently of or in unison with the sun-ray panel.

6. An educational appliance for calculating latitude, comprising a base member having a scale adjacent one edge containing degree graduations and markings indicative of the days of the year, a member representative of the earth applied to said base member and having degree graduations above and below the Equator, a panel indicative of the sun's rays fulcrumed for movement relative to said first and second-named members and having a pointer at its free edge adapted to traverse the scale on the base member, and a latitude indicator arm pivoted to the fulcrum of the sun-ray panel and movable over the earth-representing member.

7. An educational appliance for calculating latitude, comprising a base member having a scale adjacent one edge containing degree graduations and markings indicative of the days of the year, a member representative of the earth applied to said base member and having degree graduations above and below the Equator, a panel indicative of the sun's rays fulcrumed for movement relative to said first and second-named members and having a pointer at its free edge adapted to traverse the scale on the base member, a shield carried by and movable with said sun-ray panel and extending approximately over one half of the earth-representing member to indicate its periods of darkness, and an indicator arm pivoted to the fulcrum of the sun-ray panel for movement over the exposed portion of the earth-representing member to indicate the latitude of the observer on the surface of the earth, said indicator arm being movable independently of or in unison with the sun-ray panel.

JOSEPH O. OTT.